Patented Mar. 11, 1952

2,588,438

UNITED STATES PATENT OFFICE 2,588,438

CEMENT PAINT COMPOSITION

Robert L. Waide, Houston, Tex.

No Drawing. Application June 20, 1949,
Serial No. 100,300

2 Claims. (Cl. 106—95)

1

The invention relates to a composition of matter in a dry powder form which, when mixed with water is adaptable for use as a coating substance or paint.

A primary object of the instant invention is to produce a cementitious paint composition which contains no lime.

Another object of the invention is to provide a composition of matter adaptable for use as a coating substance or paint on any surface, particularly metals, brick, concrete, clay tile, asbestos, and the like.

Another object of the invention is to provide a composition of matter which is water soluble for applying to surfaces which, when dry serves to waterproof the surface to which applied.

Another object of the invention is to provide a cementitious paint coating composition which contains a high silica content to increase the strength and wear resistant qualities of such coating composition.

Other and further objects and advantages of the invention will become more fully apparent with a consideration of the following description.

A primary disadvantage with cementitious water paints heretofore known and used is that paints of this type after a period of time usually powder and turn yellow with age. The discoloration due to age is attributed to the lime content heretofore considered as a necessary component of a cementitious paint composition as described herein. Furthermore, when lime has been used heretofore in a paint composition of this particular type, difficulty is encountered since the composition tends to burn or irritate the skin of a person during the application thereof.

The instant invention is directed to a paint coating composition which overcomes the aforementioned difficulties and disadvantages of cementitious paint compositions heretofore used. It has been found through actual practice of the invention that a composition comprising substantially the proportions and materials herein pointed out produce a paint that will not powder and yellow with age nor will it burn or irritate the skin of a person applying the composition to the surface. Further, the high silica content of the solution produces a finish that is highly wear resistant and is hard and permanent over an extended period of time.

I have found that a composition may be suitably produced by mixing in substantially the following proportions: sixty pounds of white Portland cement, twenty-two pounds of fibrous talc, ten pounds of calcium carbonate having a particle size range of .5 to 10 microns, seven pounds of sodium chloride, and one pound of calcium stearate. These ingredients are preferably thoroughly mixed in powdered form. When it is desired to apply some of the substance to a surface, water is added to produce the desired consistency and the material may then be applied by brush, spray, or trowel to produce the desired surface effect.

Particular attention is directed to the components of the composition in that no lime is present as such, but that the lime content of the Portland cement is relied upon to make a workable plastic mass. Because of this feature, it has been found that a paint or coating composition comprising substantially the percentage of the components described herein will not turn yellow with age nor will it powder over an extended period of time during exposure to weather elements. The Portland cement of course, serves as a hardener while the salt cooperates to hold the moisture in the coating until the coating has had time to set on the surface to which it is applied.

The calcium stearate is added to form a water proof composition when dried on the surface to which it is applied.

The preferred composition of the fibrous talc is listed in the following table:

*Chemical and physical analysis of fibrous talc*

| | |
|---|---|
| Silica ($SiO_2$) _____per cent__ | 56.54 |
| Iron and silica $FeO-AlO$ } ($R_2O_3$) _____ | 1.04 |
| Manganese (MnO) _____ | Trace |
| Calcium oxide (CaCO) _____ | 6.25 |
| Magnesium oxide (MgO) _____ | 30.74 |
| Carbon dioxide ($CO_2$) _____ | .83 |
| Combined water ($H_2O$) _____ | 3.77 |
| Ignition loss _____ | 4.60 |
| Water at 212° F_____ | .50 |
| Sp. Gr. _____ | 2.80–3.1 |
| Hardness _____ | 4.5–5 |
| Fusion point _____ | 2615° F. |
| Dielectric strength _____ | 30 v. per mil. |

151-A (Standard):
    325 Mesh Screen 98+
    Consistency Krebs Units Standard Formula 100–104
    Oil Abs. 100 grams (Gardner-Coleman 40-cc.)

While the percentages of the particular components of talc may vary somewhat without affecting the quality of the coating composition, it is preferable to use a fibrous talc which contains a high percentage of silica.

A typical analysis of the calcium carbonate is listed below and it is to be particularly noted that the particle size range of the calcium carbonate should be in the range of .5 to 10 microns with the average particle size being about 2.5 microns. Of course the analysis of the calcium carbonate may vary to a certain extent, but in order to obtain the most desirable result with the coating composition it is preferable to have the particle size range of such calcium carbonate within the range of .5 to 10 microns.

*Typical chemical composition*

| | Per cent |
|---|---|
| Ca as CaCO$_3$ | 98.20 |
| Mg as MgCo$_3$ | 1.20 |
| Al as Al$_2$O$_3$ | 0.12 |
| Fe as Fe$_2$O$_3$ | 0.06 |
| Si as SiO$_2$ | 0.45 |
| Moisture | 0.20 |
| Insolubles in HCl | 0.81 |
| Total volatile matter at 500° C. | 0.23 |

The white Portland cement used in the coating composition on analysis will give substantially the following percentages of component parts:

| | SiO$_2$ | Al$_2$O$_3$ | Fe$_2$O$_3$ | CaO | MgO | SO$_3$ | Loss on Ignition | Soluble Alkali |
|---|---|---|---|---|---|---|---|---|
| Atlas White | 23.6 | 4.1 | 0.4 | 65.9 | 1.5 | 1.5 | 2.6 | 0.023 |

It seems obvious of course that these percentages may vary somewhat but particular attention is directed to the range of silica content of the Portland cement used, such range should be at least 20 to 30% of the total amount of constituents present in the cement.

While I have listed one specific example of the composition, my invention is not limited to this exact proportion of constituents, however I have discovered that the formula may vary to the extent that the white Portland cement can constitute 50 to 70% of the composition on a weight basis. The fibrous talc, calcium carbonate, sodium chloride, and calcium stearate can then be adjusted accordingly to obtain the remaining percentages necessary. For example, the fibrous talc will constitute approximately 15 to 22%, the calcium carbonate 5 to 10%, 5 to 10% of sodium chloride, and 1 to 3% calcium stearate. Such components will, of course, be varied proportionately to the original percentages given in my first example.

If desired, a suitable coloring agent or pigment may be added to the paint or coating composition to obtain a desired color or shade of color.

Broadly the invention contemplates a high silica content paint or coating composition which contains no lime, as such, other than that present in the cement and which when mixed with water is adaptable as a permanent waterproof paint or coating composition which may be applied to any type surface.

What is claimed is:

1. A high silica content paint composition comprising, substantially sixty percent white Portland cement containing approximately twenty-five percent silica, substantially twenty-two percent fibrous talc containing approximately sixty percent silica, substantially ten percent calcium carbonate having a particle size range of .5 to 10 microns, substantially seven percent sodium chloride and approximately one percent calcium stearate.

2. A composition of matter adapted for use as a coating and paint composition when mixed with water comprising white Portland cement fifty to seventy percent, fifteen to twenty-two percent fibrous talc, five to ten percent calcium carbonate having a particle size range of .5 to 10 microns, five to ten percent sodium chloride, and one to three percent calcium stearate.

ROBERT L. WAIDE.

REFERENCES CITED

The following references are of record in the file of this patent:

UNITED STATES PATENTS

| Number | Name | Date |
|---|---|---|
| 1,749,923 | Reardon | Mar. 11, 1930 |
| 1,970,921 | Schneider | Aug. 21, 1934 |
| 1,978,141 | Moross | Oct. 23, 1934 |